(12) United States Patent
Atri

(10) Patent No.: US 8,476,964 B1
(45) Date of Patent: Jul. 2, 2013

(54) OBTAINING ELEVATED OUTPUT VOLTAGES FROM CHARGE PUMP CIRCUITS

(75) Inventor: Jagdish Atri, St. Charles, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 13/473,673

(22) Filed: May 17, 2012

(51) Int. Cl.
*G05F 1/10* (2006.01)
(52) U.S. Cl.
USPC .......................................... 327/536; 327/538
(58) Field of Classification Search
USPC ............................ 327/536, 530, 535, 537, 538
See application file for complete search history.

(56) References Cited

U.S. PATENT DOCUMENTS

| | | | |
|---|---|---|---|
| 7,652,454 B2 | 1/2010 | Utsunomiya | |
| 8,274,323 B2 * | 9/2012 | Matsumoto et al. | 327/536 |
| 2002/0084830 A1 * | 7/2002 | Seo et al. | 327/536 |
| 2008/0007322 A1 * | 1/2008 | Asazu et al. | 327/536 |
| 2009/0153231 A1 * | 6/2009 | Pan et al. | 327/536 |
| 2012/0106255 A1 * | 5/2012 | Midorikawa | 365/185.18 |

* cited by examiner

*Primary Examiner* — Lincoln Donovan
*Assistant Examiner* — Jung H. Kim
(74) *Attorney, Agent, or Firm* — Harness, Dickey & Pierce, P.L.C.

(57) ABSTRACT

According to various aspects, exemplary embodiments are disclosed of a thermostat that includes a charge pump configured to provide a charge pump supply voltage relative to a signal ground of the charge pump. One or more diodes are connected between the charge pump and the signal ground. The one or more diodes are configured to provide a forward voltage drop to increase the charge pump supply voltage.

18 Claims, 2 Drawing Sheets

OBTAINING ELEVATED OUTPUT VOLTAGES FROM CHARGE PUMP CIRCUITS

FIELD

The present disclosure relates to obtaining elevated output voltages from charge pump circuits, such as for operating liquid crystal displays (LCDs) of thermostats or other devices.

BACKGROUND

This section provides background information related to the present disclosure which is not necessarily prior art.

Thermostats sometimes include liquid crystal displays (LCDs). A charge pump is typically used to provide the voltage for operating the LCD.

SUMMARY

This section provides a general summary of the disclosure, and is not a comprehensive disclosure of its full scope or all of its features.

According to various aspects, exemplary embodiments are disclosed of a thermostat that includes a charge pump configured to provide a charge pump supply voltage relative to a signal ground of the charge pump. One or more diodes are connected between the charge pump and the signal ground. The one or more diodes are configured to provide a forward voltage drop to increase the charge pump supply voltage.

In other various aspects, exemplary embodiments are disclosed of a power supply circuit that includes a charge pump integrated circuit (IC). The charge pump IC is configured to output a power supply voltage relative to a signal ground of the charge pump IC. One or more diodes are connected between the charge pump IC and the signal ground. The one or more diodes are configured to provide a forward voltage drop to increase the power supply voltage.

In other various aspects, exemplary embodiments are disclosed of a method of boosting voltage output of a power supply circuit. The method includes configuring a charge pump to provide the voltage output relative to a signal ground of the charge pump. The method also includes increasing a voltage potential between the charge pump and the signal ground to increase the voltage output. The increasing is performed by adding one or more diodes between the charge pump and the signal ground.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
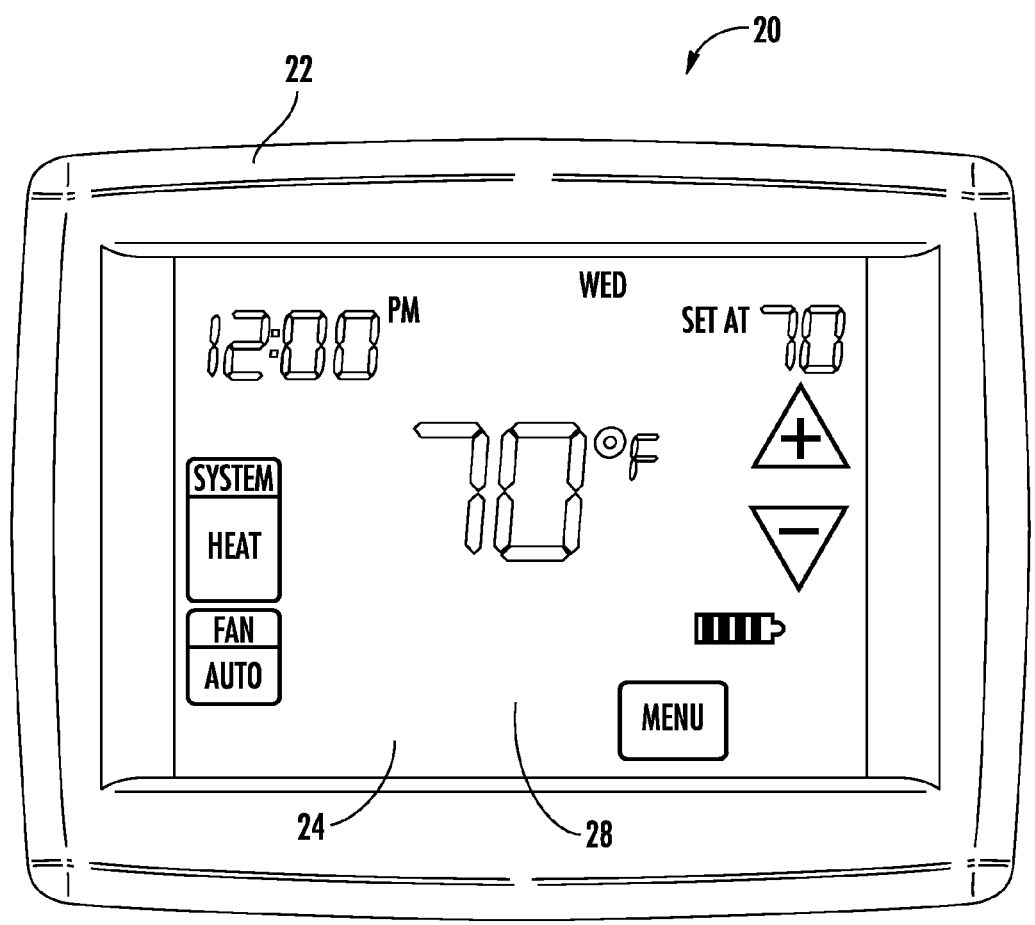
Figure 2:
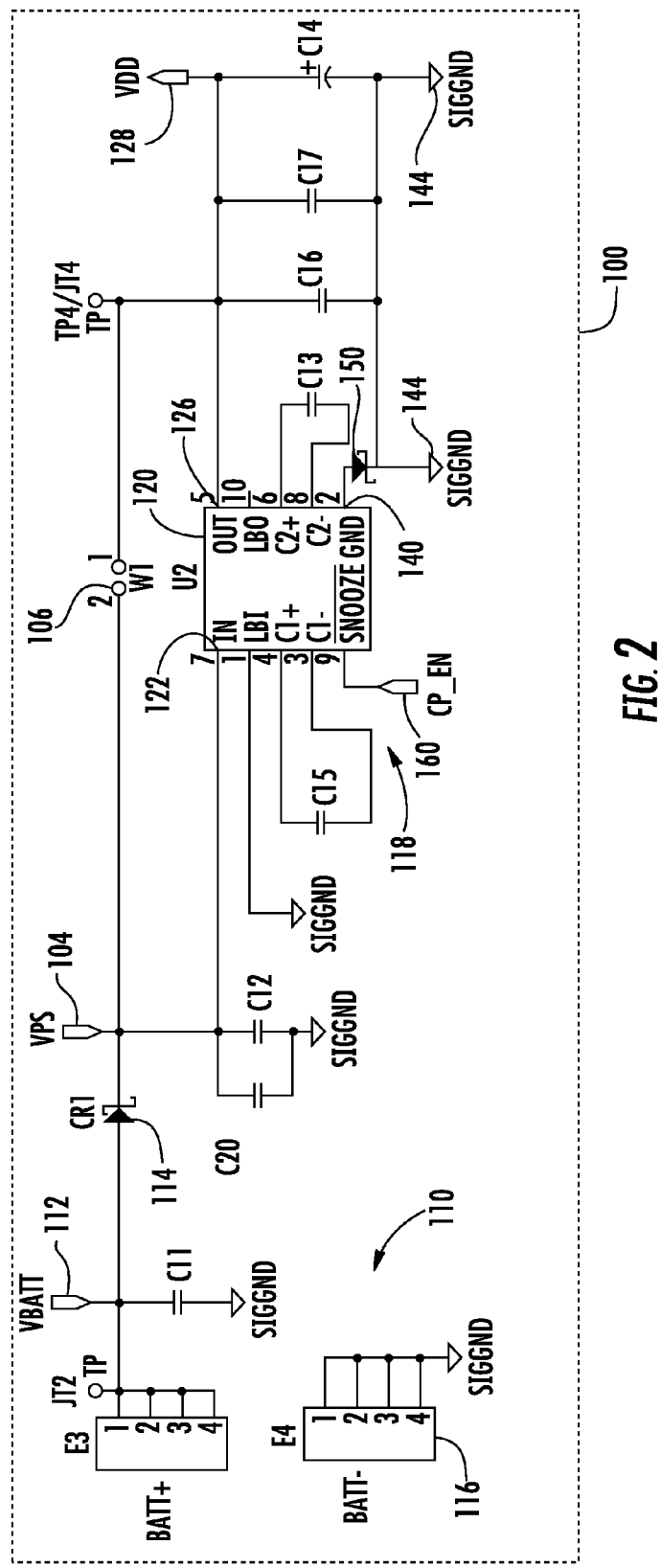

FIG. 1 is a frontal view of a thermostat configured to use a power supply according to an exemplary embodiment; and FIG. 2 is a circuit diagram showing an example of a power supply having an elevated output voltage for a thermostat (or other controller) according to an exemplary embodiment.

Corresponding reference numerals indicate corresponding parts throughout the several views of the drawings.

DETAILED DESCRIPTION

Example embodiments will now be described more fully with reference to the accompanying drawings.

As explained above in the background, thermostats sometimes include liquid crystal displays (LCDs). A charge pump, which may be an integrated circuit, is typically used to provide the voltage for operating the LCD. Some conventional 3.3V charge pump integrated circuits (ICs) operate in a special low power mode to supply a voltage for operating twelve inch HTN (High Twisted Nematic) LCDs in thermostats. The inventor hereof has recognized that the LCD contrast and display quality of such thermostat LCDs may be improved by changing to a FSTN (Film Compensated Super Twisted Nematic) LCD type of display device, which operates from a supply voltage of greater than 3.3 volts. The inventor hereof has recognized that with existing higher voltage output charge pump ICs, the operating modes available consume much higher power and result in very low battery life, leading to increased costs. After recognizing these drawbacks, the inventor hereof has developed and discloses herein exemplary embodiments of charge pump circuits having one or more additional diodes (e.g., Schottky diode(s), rectifier diode(s), other precision diode(s), etc.) that can boost or elevate the output voltages. The higher output voltages may be used, e.g., for operating displays of thermostats and other devices that require more power than would be available from the charge pump circuits in the absence of the diode(s). Such charge pump circuits include but are not necessarily limited to charge pump ICs.

In an exemplary embodiment, a Schottky diode is added between the ground pin of a charge pump IC and a signal ground of the charge pump IC. The addition of the Schottky diode can elevate the output voltage of the charge pump IC by an amount equivalent to the forward drop of the diode. The addition of the Schottky diode thus can boost a supply voltage output by a power supply circuit that includes the charge pump IC. This exemplary embodiment may, for example, be used for supplying voltage to a thermostat that includes a FSTN type LCD display. Accordingly, this exemplary embodiment is directed toward the use of a Schottky diode in a power supply circuit to boost the output voltage of a charge pump of the power supply circuit, such that a new higher-voltage-output charge pump is not necessary or required, e.g., if a thermostat's (or other device's) HTN LCD is upgraded or changed to a FSTN LCD type of display device. Also, the diode may be added to the power supply circuit such that major layout changes to the printed circuit board may not be necessary or required, With reference now to the figures, FIG. 1 illustrates an exemplary embodiment of a thermostat 20 embodying one or more aspects of the present disclosure. The thermostat 20 is configured for use in controlling a climate control system in a residence, although various aspects of the disclosure could be directed to a thermostat configured for use in other structures and/or environments and/or other controllers besides thermostats.

As shown in FIG. 1, the thermostat 20 includes a front cover 22 and a display device 24 having a display screen 28, which may be a touch screen. The display screen 28 indicates various environmental conditions detected or sensed in the residence, shows various settings that have been programmed into the thermostat 20, and provides a user interface whereby a user may enter and/or change such settings. The display device 24 may be a FSTN LCD-type device, although other device types are possible in various aspects of the disclosure. The display screen 28, and possibly other circuitry of the thermostat 20 and/or climate control system, may receive power from a power supply circuit as shall now be described.

FIG. 2 illustrates an exemplary embodiment of a power supply circuit 100 embodying one or more aspects of the present disclosure. As disclosed herein, the power supply circuit 100 may be used for supplying voltage sufficient for operating a display device of a thermostat (e.g., thermostat 20 (FIG. 1), etc.) or other device. By way of example, exemplary embodiments may include the power supply circuit 100 configured so as to be operable for providing a supply voltage of greater than 3.3 volts to a FSTN LCD type of display device of a thermostat. Alternative embodiments may include a power supply circuit configured differently, e.g., operable for providing a supply voltage less than or equal to 3.3 volts and/or to a different device (e.g., other controller or control of a climate control system, etc.) besides a thermostat and/or to a different type of device other than to a FSTN-type LCD. Indeed, exemplary embodiments of the inventor's power supply circuits may be used in many circuits requiring a secondary boost in voltage.

With continued reference to FIG. 2, the power supply circuit 100 includes a direct current (DC) voltage supply VPS 104 that provides power to a thermostat, e.g., from an external power source (not shown.) The external power source could be, e.g., a power terminal of a climate control system that includes the thermostat, and/or a power stealing circuit of the climate control system. A wire jumper W1 106 may be normally closed and/or may be opened, e.g., to prevent unintended thermostat operation due to climate control system leakage current. A backup battery power circuit, indicated generally by reference number 110, may provide a battery voltage VBATT 112 through a Schottky diode 114 to the thermostat when the voltage supply VPS 104 is unavailable, e.g., in the event of a failure of the external power source, etc. The battery power circuit 110 includes, e.g., two AA batteries 116, etc.

The voltage supply VPS 104 (or the voltage VBATT 112) is connected with a DC-DC boost charge pump circuit 118 that includes a charge pump IC 120. One example charge pump IC is a TPS60212 charge pump IC, available from Texas Instruments Incorporated, Dallas Tex. The voltage VPS is provided to the charge pump IC 120 at an input terminal 122. A microprocessor input 160 may be used, e.g., to maintain the charge pump IC 120 in a normal operating mode, e.g., in a low-power operating mode.

The charge pump IC 120 is configured to output, at a terminal 126, a regulated 3.3-volt supply voltage relative to a signal ground connected at a charge pump IC terminal 140 of the IC. But in the present example power supply circuit 100, a Schottky diode 150 is connected between the charge pump IC terminal 140 and a signal ground SIGGND 144 of the power supply circuit 100. When the thermostat is in operation and the IC 120 is providing a supply voltage at the terminal 126, the difference in potential between the charge pump IC terminal 140 and the signal ground SIGGND 144 is increased by a forward voltage drop through the Schottky diode 150. In such manner, the output voltage VDD 128 is increased by the amount of the forward voltage drop, e.g., 0.3 volts. In various embodiments, one or more diodes exhibiting various forward voltage drop(s) could be connected in a manner similar to that shown in FIG. 2, to provide various output voltage(s), e.g., for various devices and/or controls. For example, a typical Schottky diode might be used to obtain a forward voltage drop, e.g., between about 0.2 volts and about 0.4 volts. Other exemplary embodiments may configured to obtain a higher or lower forward voltage drop (e.g., between about 0.5 volts to about 1 volt, etc.), depending, for example, on the input pin limitations of the IC.

FIG. 2 also includes the following terminology relating to the example power supply circuit 100, including low battery input (LBI, low battery output (LBO), snooze (SNOOZE), ground (GND), test point for VBATT (JT2 TP), test point for VDD (TP4/JT4 TP), and battery connectors (E3 and E4). Example values for components of the power supply circuit 100 are as follows.

Capacitors C11, C17, C20—0.1 microfarad
Capacitors C12, C16—2.2 microfarads
Capacitors C13, C15—1 microfarad
Capacitor C14—100 microfarads
Wire Jumper W1—0 ohms A method of boosting voltage output of a power supply circuit can be performed that embodies one or more aspects of the present disclosure. The example method includes configuring a charge pump to provide the voltage output relative to a signal ground of the charge pump. The method also includes increasing a voltage potential between the charge pump and the signal ground to increase the voltage output. The voltage potential is increased by adding one or more diodes between the charge pump and the signal ground.

It should be noted that although various exemplary embodiments of the disclosure are described with reference to thermostats, other or additional configurations are possible in relation to devices, controllers, controls, and control systems other than thermostats. The inventor's unique schemes and methods of adding a diode to boost or elevate output voltage may be used in substantially any circuit requiring a secondary boost in voltage. Various embodiments of the foregoing circuits can provide a simple and elegant way to boost power from a charge pump circuit. In some aspects, a single diode can be added to an existing circuit without having to make major PCB layout changes, to provide maximum performance benefits while minimizing cost and effort.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A thermostat comprising:
    a charge pump configured to provide a charge pump supply voltage relative to a signal ground of the charge pump wherein the charge pump has a ground terminal; and
    one or more diodes connected between the ground terminal of the charge pump and the signal ground and configured to provide a forward voltage drop to increase the charge pump supply voltage;
    wherein the charge pump is operable for outputting a regulated output voltage absent all of the one or more diodes and for outputting a charge pump supply voltage beyond the regulated output voltage with the one or more diodes present.

2. The thermostat of claim 1, wherein the one or more diodes comprise a single diode.

3. The thermostat of claim 2, wherein the single diode is a Schottky diode.

4. The thermostat of claim 1, wherein:
    the charge pump is operable for outputting a regulated 3.3-volt output voltage as the charge pump supply voltage; and
    the thermostat further comprises a film-compensated super-twisted nematic (FSTN) display device powered by the increased supply voltage.

5. The thermostat of claim 1, wherein the charge pump comprises a charge pump integrated circuit (IC).

6. The thermostat of claim 1, wherein:
    the charge pump comprises a charge pump integrated circuit (IC) that is operable for outputting a regulated 3.3-volt output voltage absent the one or more diodes and for outputting a charge pump supply voltage beyond 3.3 volts with the one or more diodes present;
    the one or more diodes comprise a single Schottky diode; and
    the thermostat further comprises a film-compensated super-twisted nematic (FSTN) display device powered by the increased supply voltage.

7. A power supply circuit comprising:
    a charge pump integrated circuit (IC) configured to output a power supply voltage relative to a signal ground of the charge pump IC wherein the charge pump IC has a ground terminal; and
    one or more diodes connected between the ground terminal of the charge pump IC and the signal ground and configured to provide a forward voltage drop to increase the power supply voltage;

wherein the charge pump IC is operable for outputting a regulated output voltage absent all of the one or more diodes and for outputting a charge pump supply voltage beyond the regulated voltage with the one or more diodes present.

8. The power supply circuit of claim 7, wherein the one or more diodes comprise a single diode.

9. The power supply circuit of claim 8, wherein the single diode is a Schottky diode.

10. The power supply circuit of claim 7, wherein the regulated output voltage is regulated at 3.3 volts.

11. A thermostat comprising the power supply circuit of claim 7.

12. The thermostat of claim 11, wherein:
the charge pump IC is operable for outputting a regulated 3.3-volt output voltage absent the one or more diodes and for outputting a charge pump supply voltage beyond 3.3 volts with the one or more diodes present;
the one or more diodes comprise a single diode; and
the thermostat further comprises a film-compensated super-twisted nematic (FSTN) display device powered by the increased power supply voltage.

13. A method of boosting voltage output of a power supply circuit, the method comprising:
adding one or more diodes between a ground terminal of a charge pump for providing a regulated voltage output of a power supply circuit and a signal ground of the charge pump, where the charge pump is operable to provide the regulated voltage output relative to the signal ground absent any diodes between the ground terminal of the charge pump and the signal ground and to provide a charge pump supply voltage beyond the regulated voltage output with the one or more diodes present.

14. The method of claim 13, wherein adding the one or more diodes comprises adding a single Schottky diode.

15. The method of claim 13, performed to provide power to a film-compensated super-twisted nematic (FSTN) display device of a thermostat.

16. The method of claim 13, wherein the charge pump includes a charge pump integrated circuit (IC).

17. The method of claim 16, wherein the charge pump IC is configured to provide a regulated 3.3-volt output as the voltage output.

18. The method of claim 13, wherein:
adding the one or more diodes comprises adding a single Schottky diode;
the charge pump includes a charge pump integrated circuit (IC) configured to provide a regulated 3.3-volt output as the voltage output; and
the method is performed to provide power to a film-compensated super-twisted nematic (FSTN) display device of a thermostat.

* * * * *